(12) United States Patent
Banerjee (10) Patent No.: US 11,599,805 B2
(45) Date of Patent: Mar. 7, 2023

(54) METHOD AND SYSTEM FOR UTILIZING DOMAIN KNOWLEDGE TO AUTOMATICALLY IDENTIFY SOLUTION TO A PROBLEM

(71) Applicant: Tata Consultancy Services Limited, Mumbai (IN)

(72) Inventor: Snehasis Banerjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 461 days.

(21) Appl. No.: 16/861,331

(22) Filed: Apr. 29, 2020

(65) Prior Publication Data

US 2020/0387809 A1    Dec. 10, 2020

(30) Foreign Application Priority Data

Apr. 30, 2019   (IN) .............................. 201921017190

(51) Int. Cl.
*G06N 5/04*   (2023.01)
*G06N 20/00*  (2019.01)

(52) U.S. Cl.
CPC .............. *G06N 5/04* (2013.01); *G06N 20/00* (2019.01)

(58) Field of Classification Search
CPC .................................. G05N 5/00; G05N 20/00
See application file for complete search history.

(56) References Cited

U.S. PATENT DOCUMENTS

| 7,823,123 | B2 * | 10/2010 | Sabbouh | G06F 16/972 |
| | | | | 717/106 |
| 2012/0030163 | A1 | 2/2012 | Zhong et al. | |
| 2017/0147923 | A1 * | 5/2017 | Riabov | G06N 5/045 |
| 2019/0188326 | A1 * | 6/2019 | Daianu | G06F 9/453 |
| 2019/0206400 | A1 * | 7/2019 | Cui | G05D 1/0016 |

FOREIGN PATENT DOCUMENTS

| CN | 106796578 | 5/2017 |
| EP | 3246855 | 11/2017 |

* cited by examiner

*Primary Examiner* — Baboucarr Faal
(74) *Attorney, Agent, or Firm* — Finnegan, Henderson, Farabow, Garrett & Dunner LLP (57) ABSTRACT

One of the major artifacts that pushed Information Technology companies ahead of its competitors is undoubtedly contextual domain knowledge. When a new development problem comes to an IT team, how problem solving and steps of action can be automatically formulated is the major area of research. A method and system for utilizing domain knowledge to identify solution to a problem has been provided. The problem is reformulated as recommending a workflow like a pipeline of connected steps, by leveraging contextual domain knowledge and technical knowledge, finally planning and scheduling solutions steps, given a problem of a domain & use case. This is achieved by Contextual sequence-aware recommendation of steps, backed by semantic web technologies and pattern recognition steps. Finally a plan is derived by automated planning techniques which can be executed based on software orchestration by connecting a repository of re-usable annotated code blocks.

7 Claims, 9 Drawing Sheets

METHOD AND SYSTEM FOR UTILIZING DOMAIN KNOWLEDGE TO AUTOMATICALLY IDENTIFY SOLUTION TO A PROBLEM

PRIORITY CLAIM

This U.S. patent application claims priority under 35 U.S.C. § 119 to: India Application No. 201921017190, filed on 30 Apr. 2019. The entire contents of the aforementioned application are incorporated herein by reference.

TECHNICAL FIELD

The embodiments herein generally relates to the field of enterprise automation. More particularly, but not specifically, the present disclosure provides a system and method for utilizing contextual domain knowledge to automatically identify solution to a problem.

BACKGROUND

At present, a lot of stress has been given on the automation of processes in an enterprises because of repetitive nature of work. Typical IT companies gets projects from their clients that are mostly similar to old problems solved and some are totally fresh. While a combination of software and hardware technology solved the problems, the deciding factor of technology selection and execution in most cases was driven by contextual domain knowledge (CDK). However, due to lack of a system to capture and expand problem solving and allied knowledge, teams often start afresh without reusing the knowledge of a team residing at different location due to unawareness and collaboration bottlenecks. An example CDK is as follows—when an audio recording needs to be processed for speech recognition (for say home automation use case), if it is known that the device is a modern smartphone (context), then standard noise cancellation algorithms need not be applied on captured audio as by default smartphones already do active noise control implicitly (part of phone system) using reference background noise from a second microphone.

Domain knowledge can be broadly thought of two types—(1) those gathered from existing literature like books based on common collective knowledge of the community, which computing systems can parse and build a semantic map in a satisfactory way and (2) practical knowledge and thumb rules stored in an individual practitioner's mind that comes from years of experience in a niche field or from a new field where literature is still in the making. Computationally capturing the second one is challenging, yet essentially required to realize automation of problem solving in IT scenario. A few methods are being used in the prior art to capture the contextual domain knowledge or expertise of person. But they are time consuming and requires a lot of effort.

SUMMARY

Embodiments of the present disclosure present technological improvements as solutions to one or more of the above-mentioned technical problems recognized by the inventors in conventional systems. For example, in one embodiment, a system for utilizing domain knowledge to identify solution to a problem is provided. The system comprises an input module, a memory and a processor in communication with the memory. The input module captures domain knowledge using one or more of the following sources: a domain expert using a knowledge based questionnaire, parsing the web and enterprise repository based on relevant concepts and keywords, and a plurality of external sources. The processor further comprises a transformation module, a lookup table creation module, a problem definition module, a recommendation module, a PDDL transformer module and a planning module. The transformation module transforms the captured domain knowledge in the form of ontologies and instances of knowledge by applying natural language processing and template matching techniques. The lookup table creation module creates a contextual domain knowledge (CDK) look up table to store a relevant mapping of contextual knowledge to a set of fields. The problem definition module obtains the problem information from a user in the form of problem files, wherein the problem information comprises information mapped to the set of fields in the CDK lookup table. The recommendation module recommends a pipeline based on the set of fields by matching the problem with set of existing problems and fetching corresponding pipeline steps and knowledge. The PDDL transformer module converts the domain knowledge and problem files into planning domain definition language (PDDL) files. The planning module applies a planning algorithm on the PDDL files to provide the solution to match constraints with a predefined set of conditions.

In another aspect the embodiment here provides a processor implemented method for utilizing domain knowledge to identify solution to a problem. Initially, domain knowledge is captured using one or more of the following sources: a domain expert using a knowledge based questionnaire, parsing the web and enterprise repository based on relevant concepts and keywords, and a plurality of external sources. The captured domain knowledge is then transformed in the form of ontologies and instances of knowledge by applying natural language processing and template matching techniques. In the next step, a contextual domain knowledge (CDK) look up table is created to store a relevant mapping of contextual knowledge to a set of fields. Further, the problem information is obtained from a user in the form of problem files, wherein the problem information comprises information mapped to the set of fields in the CDK lookup table. In the next step, a pipeline is recommended based on the set of fields by matching the problem with set of existing problems and fetching corresponding pipeline steps and knowledge. The domain knowledge and problem files are then converted into planning domain definition language (PDDL) files. And finally, a planning algorithm is applied on the PDDL files to provide the solution to match constraints with a predefined set of conditions.

In another aspect the embodiment here provides one or more non-transitory machine readable information storage mediums comprising one or more instructions which when executed by one or more hardware processors cause utilizing domain knowledge to identify solution to a problem. Initially, domain knowledge is captured using one or more of the following sources: a domain expert using a knowledge based questionnaire, parsing the web and enterprise repository based on relevant concepts and keywords, and a plurality of external sources. The captured domain knowledge is then transformed in the form of ontologies and instances of knowledge by applying natural language processing and template matching techniques. In the next step, a contextual domain knowledge (CDK) look up table is created to store a relevant mapping of contextual knowledge to a set of fields. Further, the problem information is obtained from a user in the form of problem files, wherein the problem information comprises information mapped to the set of fields in the CDK lookup table. In the next step, a pipeline is recommended based on the set of fields by matching the problem with set of existing problems and fetching corresponding pipeline steps and knowledge. The domain knowledge and problem files are then converted into planning domain definition language (PDDL) files. And finally, a planning algorithm is applied on the PDDL files to provide the solution to match constraints with a predefined set of conditions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

Figure 1:
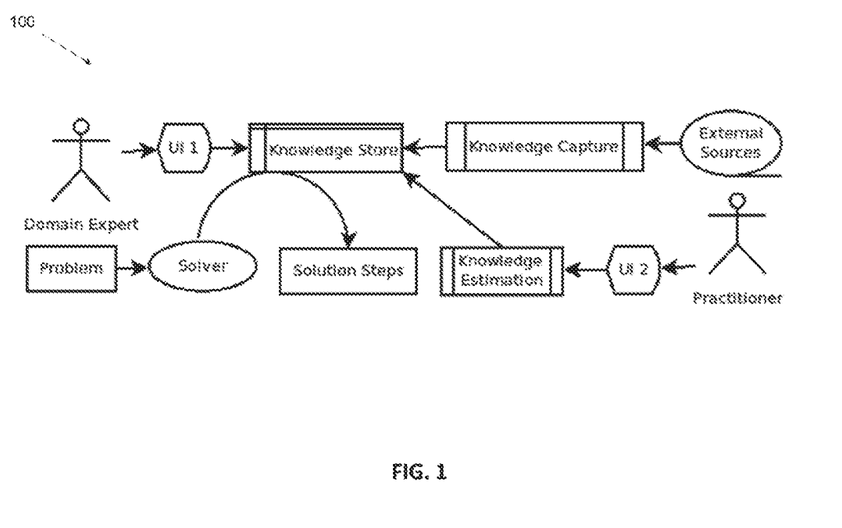
FIG. 1 illustrates a schematic overview of a system for utilizing domain knowledge to identify solution to a problem according to an embodiment of the present disclosure.
Figure 2:
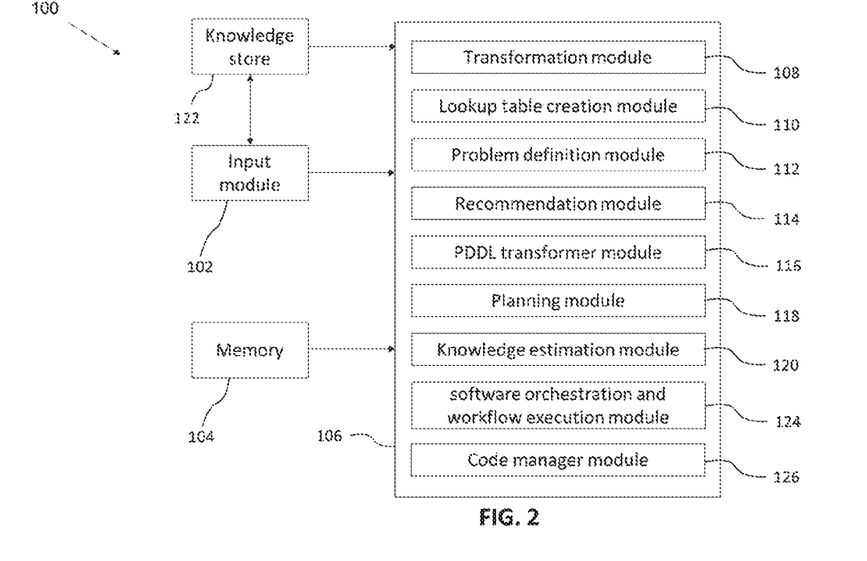
FIG. 2 illustrates a block diagram of the system for utilizing domain knowledge to identify solution to a problem according to an embodiment of the present disclosure.

According to an embodiment of the disclosure, a system 100 for utilizing contextual domain knowledge to identify solution to a problem is shown in the schematic overview of FIG. 1 and a block diagram of FIG. 2. The system 100 provides an architecture to capture different varieties of domain knowledge to successfully put problem solving into action. The system 100 is using a combination of semantic web technology, machine learning and recommendation logic to achieve its goal of providing a solution pipeline, given a standard problem specification.

As shown in FIG. 1, the domain expert (say a medical professional) provides apt knowledge through a user Interface (UI) which usually is a template based questionnaire. That captured knowledge is transformed to ontologies and instance of knowledge form by applying natural language processing and template matching techniques. Another way to capture knowledge (to be stored in knowledge store) is by parsing the web and enterprise repository based on relevant concepts and keywords. Another option is for direct connection to online stores like DBPedia (knowledge form of Wikipedia) or offline stores like enterprise NoSQL databases. The latter two are called External Sources. Another important source of knowledge is that of the thought process of a practitioner (say an IT professional). Although it is very difficult to codify this knowledge, however the following steps of Knowledge Estimation can be taken: (a) the practitioner writes down the specific steps (algorithm and technology choices) carried out while solving a problem, that can be parsed by template matching to standard generic steps (b) by asking the practitioner specific questions in a domain specific format and populating the Knowledge Store at appropriate nodes.

According to an embodiment of the disclosure, the system 100 comprises an input module 102, a memory 104 and a processor 106 as shown in the block diagram of FIG. 2. The processor 106 works in communication with the memory 104. The processor 106 is configured to execute a plurality of algorithms stored in the memory 106. The processor 106 further includes a plurality of modules for performing various functions. The processor 106 includes a transformation module 108, a lookup table creation module 110, a problem definition module 112, a recommendation module 114, a PDDL transformation module 116 and a planning module 118. The processor 106 further comprises a knowledge estimation module 120.

The input module 102 is configured to capture the input for the system 100. The input module 102 is configured to capture domain knowledge using one or more of the following sources. First, from a domain expert using a knowledge based questionnaire. Second, by parsing the web and enterprise repository based on relevant concepts and keywords. And third, using a plurality of external sources. The plurality of external sources can be offline or online external sources. In an embodiment, the input module 102 and the user interface can be the same component of the system 100. The input module 102 and the user interface (UI) can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

Figure 3:
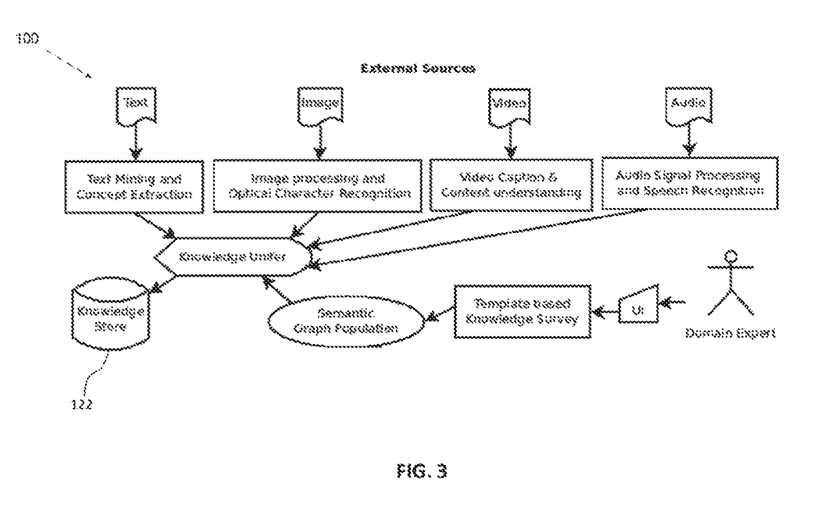
FIG. 3 shows schematic representation of a knowledge store according to an embodiment of the disclosure.

According to an embodiment of the disclosure, an architectural view for capturing the knowledge in a knowledge store 122 from various sources is shown in FIG. 3. One of the main issues in developing a system is based on knowledge is gathering and curating the relevant knowledge. With the advent of advances in machine learning and natural language processing, it is possible to capture required knowledge concepts from the web through web mining and documents through optical character recognition and then mapping to apt entities and concepts. As mentioned above the knowledge can be captured from the plurality of external sources. Documents to be processed can be enterprise knowledge base, policies, manuals, books, white papers, research papers, technical articles, blogs, news and social media content. Main forms of digital content containing knowledge are text, image, video and speech. Text can be captured by apt text mining and higher level concept extraction given seed ontology. Images needs to be processed and optical character recognition will help in understanding digital text or handwriting. Videos (such as lectures) can be processed for content identification and understanding. Audio (such as books) needs to be processed by means of speech recognition to gather underlying knowledge relevant to initial templates.

Figure 4:
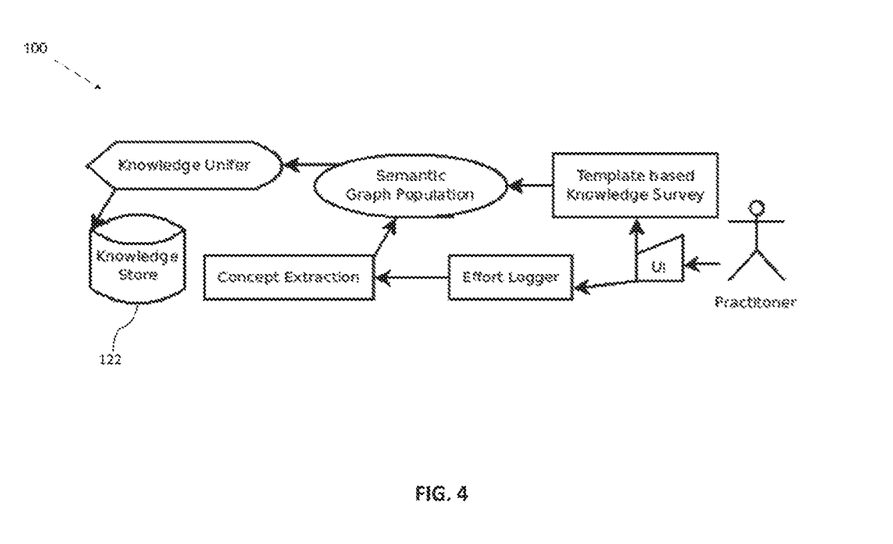
FIG. 4 shows schematic representation of knowledge estimation according to an embodiment of the disclosure.

If dealing with enterprise sensitive documents, private and secret storage becomes important. This can be achieved by anonymizing knowledge entities using data masking, and retaining the principal components of the knowledge concepts as shown in FIG. 4. In IT professional practices, apart from public domain knowledge, a considerable amount of practical knowledge is unrecorded and remains as working principles and thumb rules in the minds of experts and experienced practitioners. Capturing this information is very difficult. Some standard ways to accomplish this is by guided surveys and logging of relevant efforts of practitioners' problem solving steps. Based on initial templates this capturing can begin and later concept expansions can take place once the knowledge capturing systems learns useful patterns of questions to ask in surveys and upgraded action step templates. Once all the knowledge is captured, it is stored in the knowledge store 122. The knowledge need be populated in semantic graph based data structure and as new knowledge comes, the same will get appended at apt node locations in the graph.

According to an embodiment of the disclosure, the system 100 also comprises the knowledge estimation module 120. The knowledge estimation module 120 is concerned with evaluating human supplied knowledge as a manual process of knowledge acquiring and assignment of truth values to inferred knowledge based on past values and comparison with knowledge validated from domain experts' confidence scores and tallying with automated knowledge generation from external sources. The highest value is given to knowledge supplied by domain experts and practitioners in pre-designed templates of surveys and effort logging.

According to an embodiment of the disclosure, the system 100 comprises the transformation module 108. The transformation module 108 is configured to transform the captured domain knowledge in the form of ontologies and instances of knowledge by applying natural language processing and template matching techniques. As any typical knowledge processing needs unification of knowledge across sources in a specific form as well as storage of facts and concepts, semantic web compliant standards were selected for usage in order to make invention easy to extend with future advances. RDF (Resource Description Framework) format was selected as the format to store facts, OWL (Web Ontology Language) format was preferred as the way of concept and hierarchy representation, SPARQL (SPARQL Protocol and RDF Query Language) was chosen as the language to query knowledge patterns, rules compliant with semantic web format was selected to inference on knowledge facts.

According to an embodiment of the disclosure, the system 100 comprises a lookup table creation module 110. The lookup table creation module 110 is configured to create a contextual domain knowledge (CDK) look up table to store a relevant mapping of contextual knowledge to a set of fields. In order to store context and knowledge (domain, context, technical, etc.) the lookup table was created. This table helps in the recommendation of steps given a problem and its surrounding information.

According to an embodiment of the disclosure, the system 100 further comprises the problem definition module 112. The problem definition module 112 is configured to obtain the problem information from a user in the form of problem files, wherein the problem information comprises information mapped to the set of fields in the CDK lookup table. The user defines the problem in a standard format that gets converted to two formats: semantic web complaint and planning complaint formats for respective uses. This is supplied by the user who has got a new problem to be solved. The CDK lookup table for each problem is maintained to store the relevant mapping of contextual knowledge and meta-data around the problem to its solution pipeline (S is start and Pn is n-th subtask) and dependency on external sources for knowledge. Each of the Pn tasks has a related knowledge and associated algorithm list stored as a mapping in the Knowledge Store.

When a new problem comes it is stored in CDK tabular form and vector based similarity (such as cosine similarity) is applied to get content-based recommendation of pipeline and allied resources. An example of CDK look-up table is shown in the Table 1 below. When a Practitioner encounters Cardiac Arrhythmia prediction task on PPG dataset, the system will recommend a HRV based pipeline (closest match) by looking up the CDK table.

TABLE 1

Example of a lookup table in the healthcare domain

| Contextual Knowledge | Meta-data feature | Pipeline | External sources |
| --- | --- | --- | --- |
| Abnormal heart sound | PCG data, sampling rate | S -> P1 -> P2 -> P3 | Medical ontology |
| Heart rate variability (HRV) | PPG data, age, ethnicity | S -> P4 -> P3 -> P7 | Heart Ontology |

Figure 5:
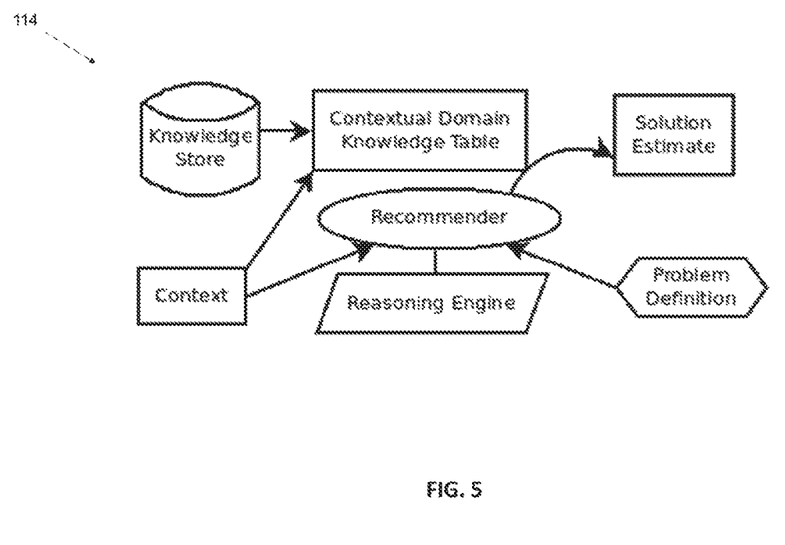
FIG. 5 shows schematic representation of a recommendation module according to an embodiment of the disclosure.

According to an embodiment of the disclosure, the system 100 comprises the recommendation module 114. A schematic representation of the recommendation module 114 is shown in FIG. 5. The recommendation module 114 is configured to recommend a pipeline based on the set of fields by matching the problem with set of existing problems and fetching corresponding pipeline steps and knowledge around it. Recommendation is done by application of a combination of situation and sequence aware similarity matching by projecting relevant features around the problem and solution in feature space. In realizing sequence aware recommendation, a sequence of pipeline is recommended based on recorded knowledge of a sequence of existing solution pipelines for specific problems, application area and domain, combined with relevant context. Reasoning also helps in semantic based recommendation that is merged with vector space based similarity matching recommendation as shown in FIG. 5. In case of inexact matches, the most similar (less distance in n-dimensional feature space of vector space model) one is recommended. In case there is closeness found in more than one solution features, a union is taken among the solution steps. The ordering of the steps as a result of the union is sorted out by automated planning algorithm by referring to the precedence of the steps and pre-conditions and post-conditions along with corresponding parameters.

According to an embodiment of the disclosure, the system 100 comprises the PDDL transformer module 116. IN one use case once a set of probable steps is recommended, a planning system needs to match constraints with problem solving goals to come up with the best solution plan. The PDDL transformer module 116 is configured to convert the domain knowledge and problem files into planning domain definition language (PDDL) files.

Figure 6:
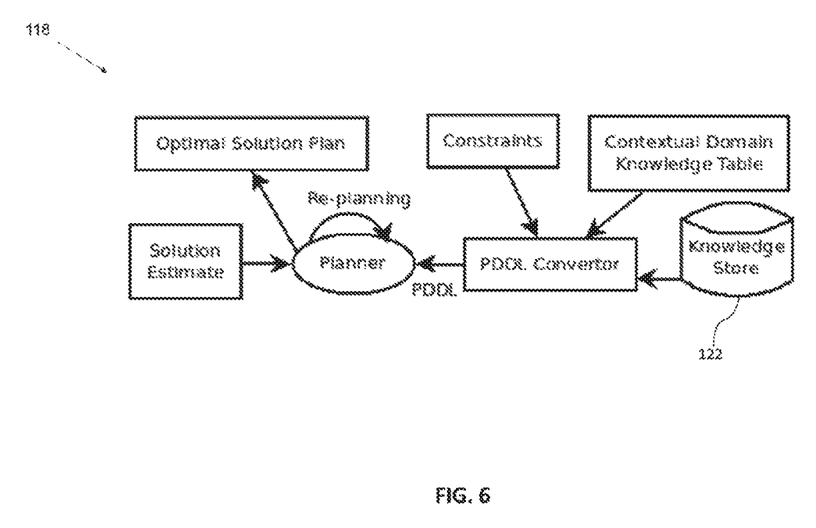
FIG. 6 shows schematic representation of a planning module according to an embodiment of the disclosure.

According to an embodiment of the disclosure, the system 100 also comprise the planning module 118 as shown in the schematic diagram of FIG. 6. The planning module 118 is configure to apply a planning algorithm on the PDDL files to provide the solution to match constraints with a pre-defined set of conditions. The predefined set of conditions may include preconditions or post conditions of the enterprise automation process. Efficient software solvers will apply suitable planning algorithms on the PDDL files to come up with the best path among many paths in search space. The planning module 118 can be a fast forward planner is given the PDDL files to come out with the ideal plan satisfying pre-conditions, post-conditions and constraints. The ideal plan can be printed out. A user can look at the plan to carry out the actuation part with finer tuning as found suitable. Another option is to make the actuation part realized through work-flow composition and actuation.

Figure 7:
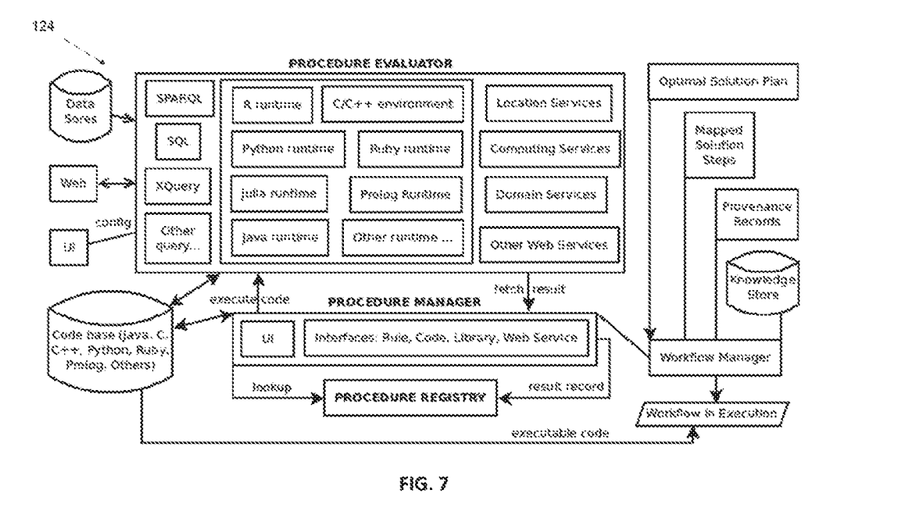
FIG. 7 shows schematic representation of software orchestration and workflow execution module according to an embodiment of the disclosure.

According to an embodiment of the disclosure, the system 100 may also comprise a software orchestration and work-flow execution module 124 as shown in the schematic architecture of FIG. 7. To execute the plan, software orchestration of code blocks needs to be applied. Code blocks are functional algorithms that can be used to stitch logic needed to satisfy a sub task of a solution implementation. As an example, this stitching can be achieved by applying machine learning processing on a data-set, the sub tasks being pre-processing, feature generation, feature selection, modeling and performance evaluation. Procedure Registry maintains list of code executions and their functionality. Procedure Manager acts as a uniform wrapper service to encapsulate the actual run-time environments of code in execution. Procedure evaluator is the set of runtimes where code fetched from code repository gets executed. Procedure evaluator has plugins with external databases via query mechanisms and web services. Scientific work-flow based approaches can also be applied in this scenario to keep track of progress of work-flow execution, provenance and stability.

According to an embodiment of the disclosure, the system 100 also comprises the code manager module 126. The code manager module 126 is configured to connect loose couples in a chain based on demand. Due to diverse sources of code in different languages, the Code Manager helps in connecting loose couples in a chain based on demand on executing workflow.

Figure 8A:
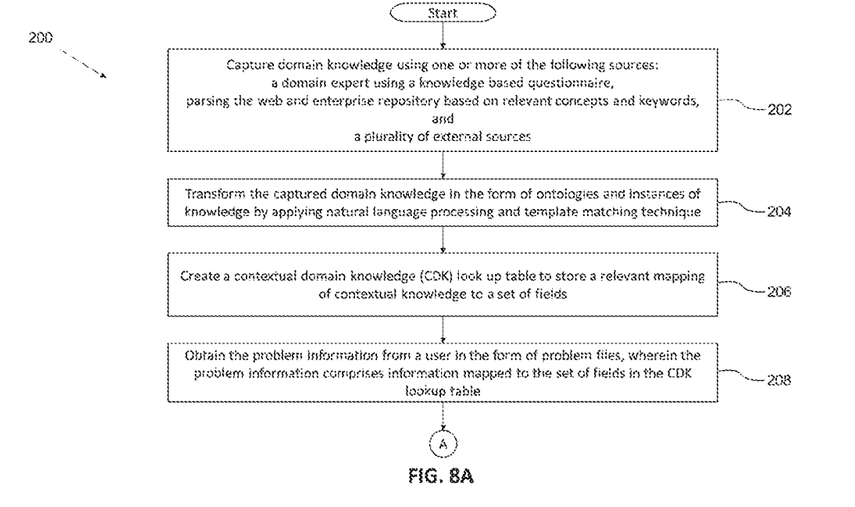
FIG. 8A-8B is a flowchart illustrating the steps involved in utilizing domain knowledge to identify solution to a problem according to an embodiment of the present disclosure.
Figure 8B:
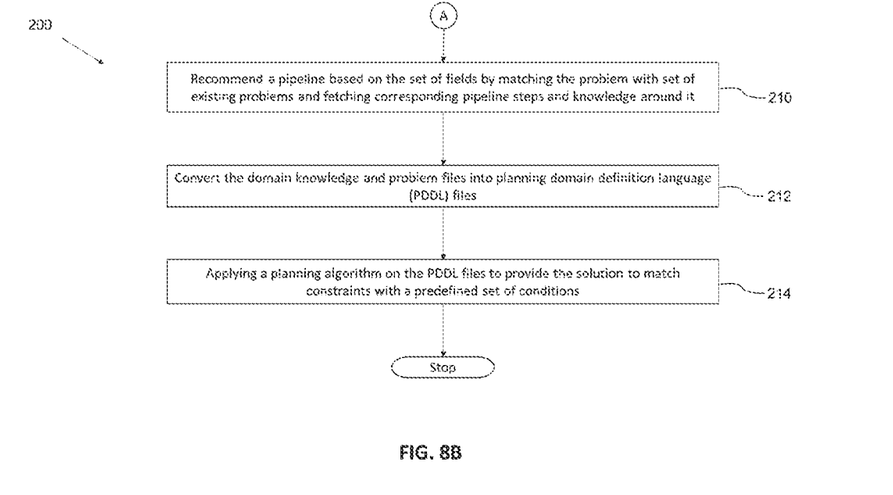

In operation, a flowchart 200 illustrating a method for utilizing the contextual domain knowledge to identify solution to a problem is shown in FIG. 8A-8B. Initially at step 202, the domain knowledge is captured using one or more of the following sources: a domain expert using a knowledge based questionnaire, parsing the web and enterprise repository based on relevant concepts and keywords, and the plurality of external sources either offline or online. In the next step 204, the captured domain knowledge is transformed in the form of ontologies such as OWL and instances of knowledge such as RDF by applying natural language processing and template matching techniques In the next step 206, a contextual domain knowledge (CDK) look up table is created to store a relevant mapping of contextual knowledge to a set of fields. The set of fields may include context, domain, metadata etc. Further at step 208, the problem information is obtained from a user in the form of problem files, wherein the problem information comprises information mapped to the set of fields in the CDK lookup table.

In the next step 210, a pipeline is recommended based on the set of fields by matching the problem with set of existing problems and fetching corresponding pipeline steps and knowledge around it. At step 212, the domain knowledge and problem files are converted into planning domain definition language (PDDL) files. And finally at step 214, the planning algorithm is applied on the PDDL files to provide the solution to match constraints with the predefined set of conditions. The predefined set of conditions include precondition, post condition and various constraints.

According to an embodiment of the disclosure, the system 100 can also be explained with the help of a use case in the field of healthcare domain.

A health-care use case focused on heart disease prediction (abnormal heart sound classification) is considered. The dataset comprises of phonocardiogram (PCG) audio samples taken from the data available in the prior art. By studying the literature (mainly research papers), a practitioner can identify the three main steps to carry out the given task. Segmentation is done by standard S1-S2 algorithm whereas for classification Random Forest based modeling has shown to yield good results. In pre-processing subtask, the following domain knowledge were identified for usage by the Practitioner when handling PCG signals related to human heart: (1) the data (usually at 2 KHz) can be down-sampled to 400 Hz without losing out important features for the task (processing time is less for a signal with lower sampling rate) (2) using Butterworth filter in the 20-400 KHz range cut off frequencies is the next recommended step (3) Spike removal needs to be applied on the data (4) Signal normalization needs to be carried out (5) Ideal window size for further processing is 5 seconds overlapping, as recommended by doctors with the logic that any signature pattern of abnormal heart activity will be pointed out in this time interval.

A section of computer readable domain knowledge used for the problem in RDF format is shown as follows:

1. <problem:heartSound> <sig:windowSizeInSeconds> 5
2. <problem:heartSound> <sig:upperBoundFreqInHz> 400

A section of meta-data facts supplied for the problem:

1. <data:dataInstance> <sig:samplingRateInHz> 2000
2. <data:dataInstance> <file:format> <file:wav>
3. <data:dataInstance> <data:hasSource> 'file path'

A section of algorithmic knowledge stored in ontology:

1. <sig:MedianFilter> <sig:type> <sig:NonLinearFilter>
2. <sig:LowPassFilter> <sig:type> <siglinearFilter>

```
3. <siglinearFilter> <sig:type> <sig:Filter>
4. <task:PreProcessing> <task:subTask> <sig:Filter>
A section of procedural rules (custom defined) used:
1. [ AutoResample: (?data <data:hasSource> ?url ) . (?data <problem:category> ?p) .
(?data <sig:samplingRateInHz> ?val1) . (?data <sig:upperBoundFreqInHz> ?val2) ->
c:resampleA(?url, ?val1, ?val2, ?urln) . (?p <task:completion>
<sig:AutoResample>) . (?data <data:newSource> ?urln) ]
2. [ LowPassFilter: (?data <data:hasSource> ?url) . (?data <problem:category> ?p).
(?p <sig:upperBoundFreqInHz> ?val) -> c:lowpass(?url, ?val, ?urln) . (?p
<task:completion> <sig:LowPassFilter>) . (?data <data:newSource> ?urln) ]
```

The above knowledge can be encoded in forms of semantic web based knowledge representation technologies and whenever a new but similar dataset or problem comes, the system will be able to recommend a possible approach to take to solve the problem. In this way, instead of starting from scratch, the practitioner will get a guidance which steps to take or focus more on and which to neglect. In an enterprise, this approach will help accelerating delivery time through mutual knowledge exchange using digital means.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein solves the problems involved in typical IT enterprises related to automatic formulation. The disclosure provides a method and system for utilizing domain knowledge to identify solution to a problem.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method (200) for utilizing domain knowledge to identify solution to a problem, the method comprising:
capturing via one or more hardware processors, domain knowledge using one or more of the following sources (202):
a domain expert using a knowledge based questionnaire,
parsing the web and enterprise repository based on relevant concepts and keywords, and
a plurality of external sources;
transforming via one or more hardware processors, the captured domain knowledge in form of ontologies and instances of knowledge by applying natural language processing and template matching techniques (204);
creating via one or more hardware processors, a contextual domain knowledge (CDK) look up table for a set of existing problems to store a mapping of contextual knowledge and meta-data features around each existing problem to corresponding solution pipelines (206), wherein the solution pipelines are a plurality of sub-tasks required for solution implementation, with each subtask comprising a related knowledge and associated algorithm list stored as the mapping in a knowledge store;
obtaining via one or more hardware processors, the problem information from a user in the form of problem files, wherein the problem information comprises information mapped to the CDK lookup table (208);
recommending via one or more hardware processors, a sequence of the solution pipelines by matching the problem with set of existing problems in the CDK look up table and fetching corresponding solution pipeline steps (210), wherein the recommendation is performed by:
a sematic based recommendation; and
a situation and sequence aware similarity matching by projecting features around the problem and solution in a n-dimensional feature space and recommending the solution pipelines by applying a vector based similarity, wherein a union among the solution pipeline steps is taken if the similarity is found in more than one solution feature;

converting via one or more hardware processors, the domain knowledge and the problem files into planning domain definition language (PDDL) files (212); and applying via one or more hardware processors, a planning algorithm on the PDDL files to order the recommended solution pipeline steps and provide an ideal solution path among many solution paths in search space by matching constraints with a predefined set of conditions (214).

2. The processor implemented method of claim 1, further comprising the step of evaluating the relevance of knowledge captured from the one or more sources.

3. The processor implemented method of claim 1 further comprising the step of reasoning to perform semantic based recommendation.

4. The processor implemented method of claim 1, wherein the plurality of external sources include online knowledge stores or offline knowledge stores.

5. A system (100) for utilizing domain knowledge to identify solution to a problem, the system comprises:

an input module (102) for capturing domain knowledge using one or more of the following sources:
   a domain expert using a knowledge based questionnaire,
   parsing the web and enterprise repository based on relevant concepts and keywords, and
   a plurality of external sources;

a memory (104); and a processor (106) in communication with the memory, the processor further comprising:
   a transformation module (108) for transforming the captured domain knowledge in form of ontologies and instances of knowledge by applying natural language processing and template matching techniques;
   a lookup table creation module (110) for creating a contextual domain knowledge (CDK) look up table for a set of existing problems to store a mapping of contextual knowledge and meta-data features around each existing problem to corresponding solution pipelines, wherein the solution pipelines are a plurality of subtasks required for solution implementation, with each subtask comprising a related knowledge and associated algorithm list stored as the mapping in a knowledge store;
   a problem definition module (112) for obtaining the problem information from a user in the form of problem files, wherein the problem information comprises information mapped to the CDK lookup table;
   a recommendation module (114) for recommending a sequence of the solution pipelines by matching the problem with set of existing problems in the CDK look up table and fetching corresponding pipeline solution steps, wherein the recommendation is performed by:
   a sematic based recommendation; and
   a situation and sequence aware similarity matching by projecting features around the problem and solution in a n-dimensional feature space and recommending the solution pipelines by applying a vector based similarity, wherein a union among the solution pipeline steps is taken if the similarity is found in more than one solution feature;
   a PDDL transformer module (116) for converting the domain knowledge and the problem files into planning domain definition language (PDDL) files; and
   a planning module (118) for applying a planning algorithm on the PDDL files to order the recommended solution pipeline steps and provide an ideal solution path among many solution paths in search space by matching constraints with a predefined set of conditions.

6. The system of claim 5 further comprises a knowledge estimation module (120) to evaluate the relevance of knowledge captured from the one or more sources.

7. One or more non-transitory machine readable information storage mediums comprising one or more instructions which when executed by one or more hardware processors cause managing a plurality of events, the instructions cause:

capturing via one or more hardware processors, domain knowledge using one or more of the following sources:
   a domain expert using a knowledge based questionnaire,
   parsing the web and enterprise repository based on relevant concepts and keywords, and
   a plurality of external sources;

transforming via one or more hardware processors, the captured domain knowledge in form of ontologies and instances of knowledge by applying natural language processing and template matching techniques;

creating via one or more hardware processors, a contextual domain knowledge (CDK) look up table for a set of existing problems to store a mapping of contextual knowledge and meta-data features around each existing problem to corresponding solution pipelines, wherein the solution pipelines are a plurality of subtasks required for solution implementation, with each subtask comprising a related knowledge and associated algorithm list stored as the mapping in a knowledge store;

obtaining via one or more hardware processors, the problem information from a user in the form of problem files, wherein the problem information comprises information mapped to the CDK lookup table;

recommending via one or more hardware processors, a sequence of the solution pipelines by matching the problem with set of existing problems in the CDK look up table and fetching corresponding solution pipeline steps, wherein the recommendation is performed by:
   a sematic based recommendation; and
   a situation and sequence aware similarity matching by projecting features around the problem and solution in a n-dimensional feature space and recommending the solution pipelines by applying a vector based similarity, wherein a union among the solution pipeline steps is taken if the similarity is found in more than one solution feature;

converting via one or more hardware processors, the domain knowledge and the problem files into planning domain definition language (PDDL) files; and applying via one or more hardware processors, a planning algorithm on the PDDL files to order the recommended solution pipeline steps and provide an ideal solution path among many solution paths in search space by matching constraints with a predefined set of conditions.

* * * * *